United States Patent
Sato

(10) Patent No.: US 9,616,521 B2
(45) Date of Patent: Apr. 11, 2017

(54) SURFACE TREATMENT METHOD FOR METAL MATERIAL AND FORCE SENSOR

(71) Applicant: MINEBEA CO., LTD., Kitasaku-Gun, Nagano (JP)

(72) Inventor: Satoshi Sato, Fujisawa (JP)

(73) Assignee: Minebea Co., Ltd., Nagano (JP)

( * ) Notice: Subject to any disclaimer, the term of this patent is extended or adjusted under 35 U.S.C. 154(b) by 129 days.

(21) Appl. No.: 14/753,508

(22) Filed: Jun. 29, 2015

(65) Prior Publication Data
US 2015/0377721 A1 Dec. 31, 2015

(30) Foreign Application Priority Data

Jun. 30, 2014 (JP) .................................. 2014-134295

(51) Int. Cl.
*G01L 1/04* (2006.01)
*B23K 26/00* (2014.01)
*G01L 1/22* (2006.01)

(52) U.S. Cl.
CPC ........ *B23K 26/0078* (2013.01); *G01L 1/2243* (2013.01)

(58) Field of Classification Search
CPC ..... B23K 26/0078; G01L 1/2243; G01L 1/04; G01L 3/08; G01L 1/02; G01L 1/106; G01L 3/24; B60R 2021/01516
USPC ...... 73/862.621, 862.381, 862.321, 862.581, 73/59, 862.636, 862
See application file for complete search history.

(56) References Cited

U.S. PATENT DOCUMENTS

| 5,539,158 A * | 7/1996 | Utsunomiya ......... G01L 1/2243 |
| | | 177/211 |
| 2004/0060372 A1* | 4/2004 | Hopkins ............... G01L 1/2268 |
| | | 73/862.637 |

FOREIGN PATENT DOCUMENTS

JP 4020957 B2 12/2007
JP 2013-111881 A 6/2013

* cited by examiner

*Primary Examiner* — Lisa Caputo
*Assistant Examiner* — Nigel Plumb
(74) *Attorney, Agent, or Firm* — Carrier Blackman & Associates, P.C.; Joseph P. Carrier; William D. Blackman

(57) ABSTRACT

A surface treatment method for roughening a surface of a metal material by a laser beam includes: forming a roughened surface adhesion portion on the surface of the metal material by irradiating the laser beam on the surface of the metal material to form a plurality of roughened regions within the roughened surface adhesion portion, each of the roughened regions being formed in a circular shape having an outer ring adjacent to each other. The roughened regions are arranged to satisfy the following Equation (1):

$$0.5a < d < 1.5a \qquad (1)$$

where "a" is a diameter of the outer ring of each of the roughened regions, and "d" is a center pitch between adjacent roughened regions.

16 Claims, 9 Drawing Sheets

SURFACE TREATMENT METHOD FOR METAL MATERIAL AND FORCE SENSOR

BACKGROUND OF THE INVENTION

1. Field of the Present Disclosure

The present disclosure relates to a surface treatment method for a metal material in which the surface of the metal material is roughened to make a resin component or the like reliably adhere to the metal material, and a force sensor obtained using the method.

2. Description of the Related Art

Sandblasting, which is a technique to roughen a metal surface by blowing fine sand grains to the surface, is known as a technique of the related art of forming a roughened surface on the surface of a metal component to improve adhesiveness between the metal component and a resin component.

When sandblasting is performed, first, a masking tape is attached to a metal surface and a desired portion of the metal surface is activated (roughened) by sandblasting. Next, abrasives used in the sandblasting and metal filings are removed and the masking tape is peeled off. Lastly, the entirety including the metal surface is washed. At this time, some of the abrasives and metal filings remain on the metal surface and when a resin component or the like adheres to a metal component, some of the abrasives and metal filings are regarded as foreign substances on an adhesive layer, which cause deterioration in yield rate in the process or inhibit the adhesion and weaken adhesion strength. In the worst case, a problem that the both components are peeled off from each other may easily arise.

On the other hand, as a surface treatment method for a metal material not using such sandblasting, for example, techniques of using a laser are known. An example of such techniques is disclosed in JP-A-2013-111881 and in JP-B2-4020957.

According to the techniques of using a laser, only a position to be activated may be targeted since the laser irradiation has high accuracy, and thus when sandblasting is replaced with laser processing, a masking tape is not required. Thus, a masking process and a washing process for a metal surface subjected to sandblasting can be omitted. In addition, since the washing process is not required, a defective mode such as deterioration in adhesion force between a resin component and a metal component caused by some of abrasives and metal filings from sandblasting does not occur.

In the technique disclosed in JP-A-2013-111881, laser irradiations are successively performed along a line, and the interval between the formed laser irradiation traces is 250 μm or less. This technique improves adhesiveness between a metal component and a resin component by forming a roughened surface on the surface of the metal component by a laser. Specifically, this technique adjusts the interval (hatching width) between adjacent roughened surfaces to 250 μm or less and the depth of unevenness that forms the roughened surface to 50 μm or less. A more preferable range of the hatching width is 100 μm or more and 250 μm or less as described in paragraph [0025] of JP-A-2013-111881. In addition, in the technique disclosed in JP-A-2013-111881, the laser beam irradiation range is preferably a circle diameter of 200 μm or less and most preferably 60 μm to 130 μm as described in paragraph [0030] of the JP-A-2013-111881. That is, in this technique, the each of laser irradiation ranges is set to be considerably wide.

In general, the formation of the roughened surface portion having a wide laser beam irradiation range and a wide hatching width on the surface of the metal member is applied in a case of making a resin member adhere to the roughened surface portion of the metal member using an injection molding technique of injecting a resin into a mold at a high pressure. Accordingly, when the resin member is attached to the metal member with an adhesive layer of an adhesive or the like interposed between instead of using the injection molding technique, a wide base metal region not processed by the laser beam remains on the surface of the metal member. Thus, the adhesive layer may be peeled off from this unprocessed region and sufficient adhesion strength may not be maintained.

Further, the publication JP-B2-4020957 discloses a technique of joining a metal member and a different member using a laser processing technique and in the metal member having a joined portion with the different member, the joined portion is formed in such a manner that the metal member is subjected to laser scanning processing in a predetermined scanning direction and then subjected to laser scanning processing in another scanning direction intersecting the scanning direction.

It is assumed that the technique disclosed in JP-B2-4020957 is used in injection molding. Based on such an assumption, when the metal surface roughened by a laser is intentionally elevated and a bridge between adjacent portions is formed, a resin enters under the bridge due to the pressure during the injection molding and is set, and thus an anchor effect is obtained. However, when the resin component is attached to the metal component with the adhesive layer of an adhesive or the like interposed between, the pressure during the injection molding cannot be used and as shown in FIG. 8, the adhesive or the like does not enter under the bridge and thus an air layer is formed under or near the bridge, where it should exhibit the conventional anchor effect. As a result, even when the resin member is attached to the metal member with the adhesive layer of an adhesive or the like interposed between, the area in which the adhesive layer is in close contact with the surface of the metal member is considerably reduced. Thus, sufficient adhesion strength may not be maintained and the resin member may easily be peeled off from the metal member.

SUMMARY

One of objects of the present disclosure is to provide a surface treatment method for a metal material, in which when a different material such as a resin material or the like is attached to a metal material with an adhesive layer interposed between, this different material is not easily peeled off from the metal material, and a force sensor obtained using the method.

According to an illustrative embodiment of the present disclosure, there is provided a surface treatment method for roughening a surface of a metal material by a laser beam. The method includes: forming a roughened surface adhesion portion on the surface of the metal material by irradiating the laser beam on the surface of the metal material to form a plurality of roughened regions within the roughened surface adhesion portion, each of the roughened regions being formed in a circular shape having an outer ring adjacent to each other. The roughened regions are arranged to satisfy the following Equation (1):

$$0.5a < d < 1.5a \tag{1}$$

where "a" is a diameter of the outer ring of each of the roughened regions, and "d" is a center pitch between adjacent roughened regions.

According to another illustrative embodiment of the present disclosure, there is provided a force sensor including: a strain body formed of a metal material having a roughened surface adhesion portion on at least one surface, the roughed surface adhesion portion being formed by the surface treatment method; and a strain gauge attached to the roughened surface adhesion portion with an adhesive.

According to still another illustrative embodiment of the present disclosure, there is provided a force sensor including: a strain body formed of a metal material and having a hollow portion located at an inner central portion, the strain body having a roughened surface adhesion portion formed above the hollow portion; and at strain gauge attached to the roughened surface adhesion portion with an adhesive. Each of the roughened regions is formed in a circular shape having an outer ring adjacent to each other. The roughened regions are arranged to satisfy the following Equation (3):

$$0.5a < d < 1.5a \tag{3}$$

where "a" is a diameter of the outer ring of each of the roughened regions, and "d" is a center pitch between adjacent roughened regions.

DETAILED DESCRIPTION

Figure 1:
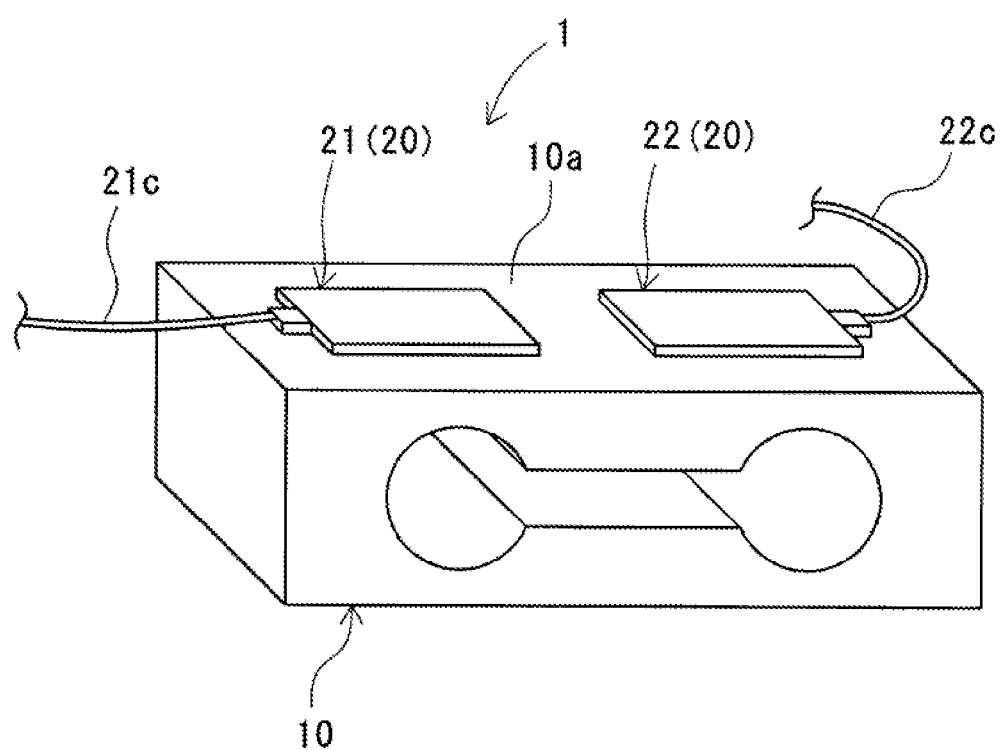
FIG. 1 is a schematic perspective view of a force sensor obtained using a surface treatment method for a metal material according to an embodiment of the present disclosure.
Figure 2:
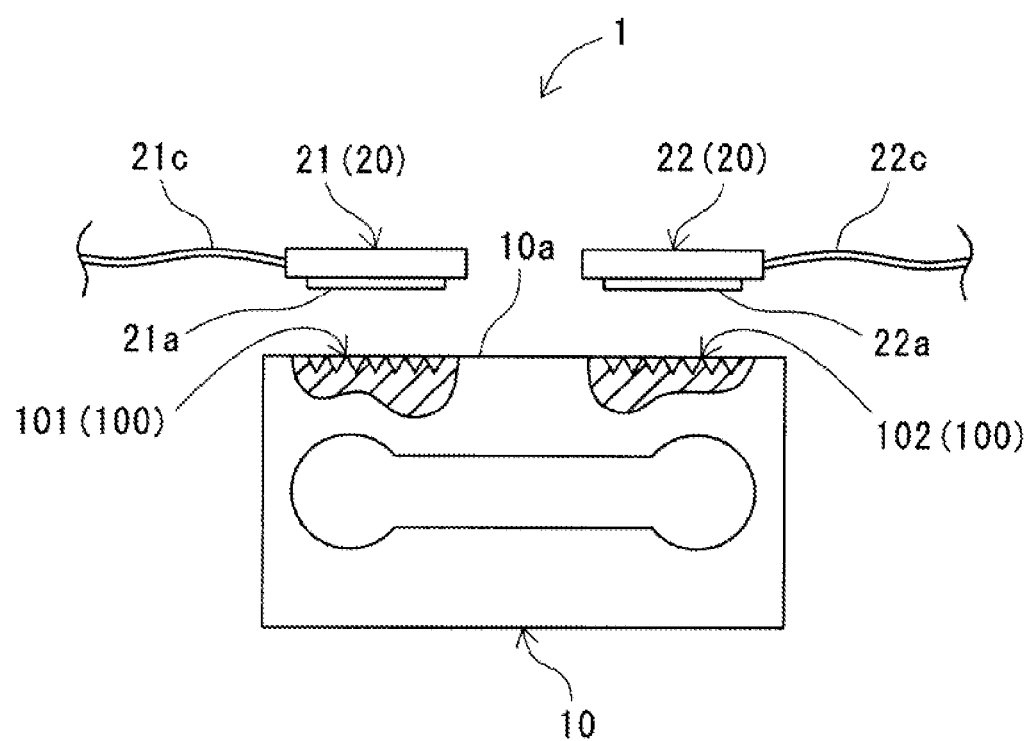
FIG. 2 is a side view separately showing a metal portion and a resin portion of the force sensor shown in FIG. 1.

Hereinafter, a surface treatment method for a metal material according to an embodiment of the present disclosure and a force sensor obtained using the same will be described. First, the schematic configuration of the force sensor according to the embodiment will be described. FIG. 1 is a schematic perspective view of a force sensor obtained using a surface treatment method for a metal material according to an embodiment of the present disclosure. Further, FIG. 2 is a side view separately showing a metal portion and a resin portion of the force sensor shown in FIG. 1.

A force sensor 1 according to the embodiment is configured by, for example, a strain body 10 which has a rectangular parallelepiped shape, both side surfaces being perforated defining a hollow portion located at an inner central portion, and a roughened surface adhesion portions 101 and 102 (100) (refer to FIG. 2) which are respectively formed on the upper surface with an interval between in a longitudinal direction, strain gauges 21 and 22 (20) adhering to the roughened surface adhesion portions 100 of the strain body 10, and the like.

The strain body 10 is formed of metal material, and the metal material such as an aluminum alloy, iron, or stainless steel may be appropriately selected according to a load to be measured. Both the strain gauges 20 are respectively formed of a resin such as polyimide and include a strain gauge element (not shown) whose resistance changes according to a load to be applied to the strain body 10 therein. Wires 21c and 22c for extracting a signal according to a load to be applied to the strain body 10 are drawn out from each of the strain gauges 21 and 22. In addition, adhesive layers 21a and 22a, which are formed of an adhesive or the like, for attaching the respective strain gauges 21 and 22 to predetermined portions on an upper surface 10a of the strain body 10, are formed on the bottom surfaces of both the strain gauges 21 and 22 (refer to FIG. 2).

On the upper surface 10a of the strain body 10, the roughened surface adhesion portions 101 and 102 (100) are formed at positions corresponding to the regions to which the adhesive layers 21a and 22a are attached. In the embodiment, the roughened surface adhesion portion 100 is formed by the surface treatment method for a metal material according to the embodiment and not by a sandblasting according to the related art.

Next, the surface treatment method for a metal material according to the embodiment for forming the above-described roughened surface adhesion portion 100 will be described. The surface treatment method for a metal material according to the embodiment is a surface treatment method of roughening a surface of a metal material such as an aluminum alloy, iron, or stainless steel by a laser beam, and the outer circumferences (outer rings) of adjacent circular roughened regions (surface processing regions) formed by the respective laser irradiations are close to each other.

That is, the roughened surface adhesion portions 101 and 102 according to the embodiment are formed at predetermined positions on the upper surface 10a of the strain body 10 which is a metal material (metal member). The roughened surface adhesion portions 101 and 102 are formed by a large number of the circular roughened regions 110 being close to each other, and the circular roughened regions 110 are arranged at very small intervals and have very small diameters.

Figure 3:
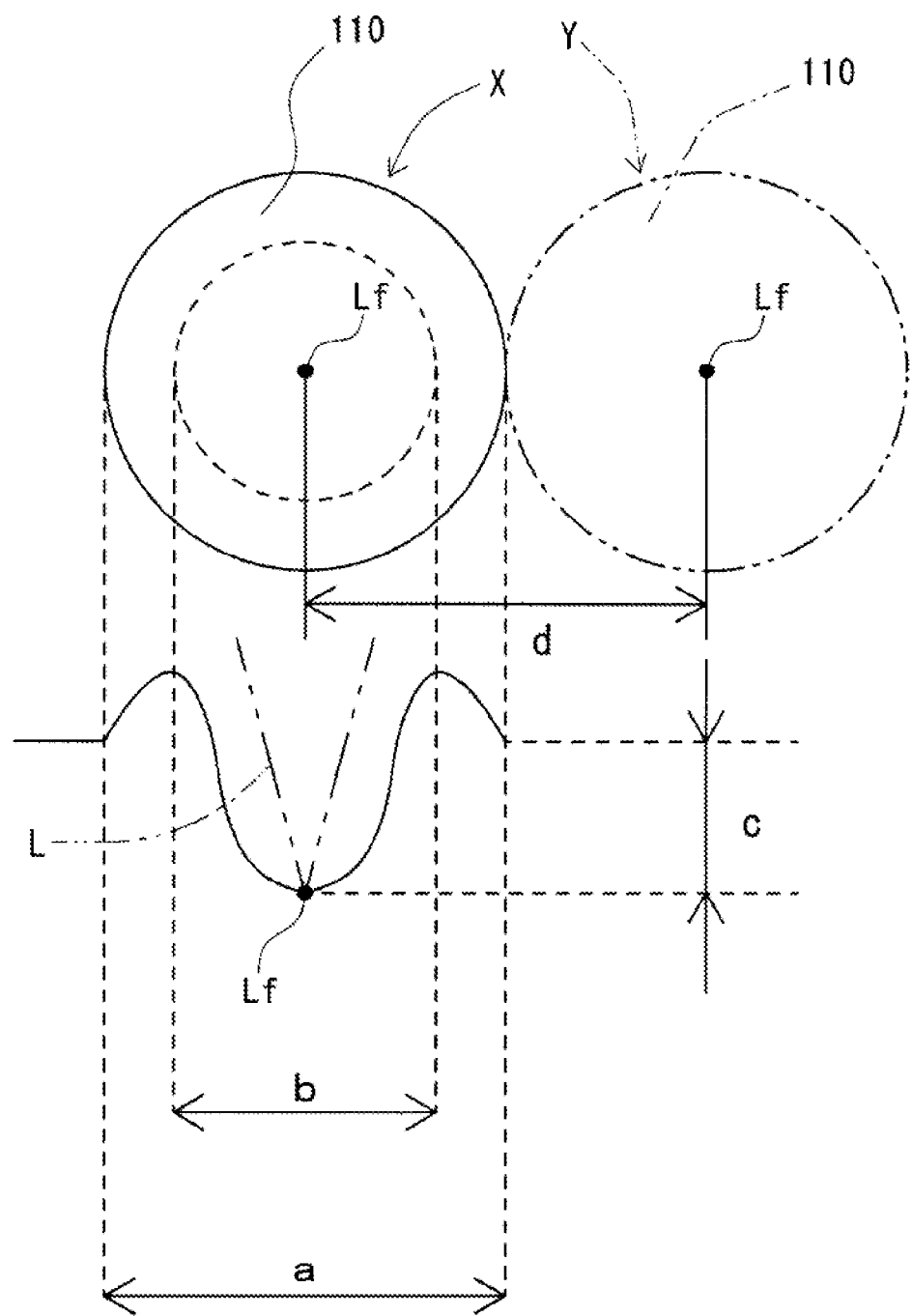
FIG. 3 is an illustration showing a dimensional relationship between adjacent roughened regions roughened by laser irradiation.

FIG. 3 is an illustration showing a dimensional relationship between adjacent roughened regions 110 roughened by laser irradiation. In FIG. 3, two circles on the upper side show the adjacent roughened regions 110 are seen in plan view, and the left roughened region 110 with a circle X is indicated by a solid line or a dotted line and the right roughened region 110 with a circle Y is indicated by an imaginary line (double-dashed line). In addition, the circle X shown on the lower left side of FIG. 3 represents a cross section obtained by cutting the region along a diameter direction passing through the center portion related to a focus Lf of a laser irradiation L corresponding to the left roughened region 110. The circle X is shown without a cross-sectional hatching.

In the dimensional relationship in the case of the embodiment, the roughened surface adhesion portion 100 is formed such that when the diameter of the outer ring of the roughened region 110 formed by laser irradiation is "a" and the center pitch between adjacent roughened regions 110 formed by laser irradiation is "d", the dimensional relationship between all the adjacent circular roughened regions is "a=d".

In FIG. 3, the reference sign "b" represents the diameter of a circular portion having the greatest height in the roughened region 110 and the reference sign "c" represents the depth of a valley portion having the deepest depth in the roughened region 110 when seen from the height of the metal surface before laser irradiation. In the embodiment, a≅20 μm, d≅20 μm, and c≅5 μm.

Figure 4:
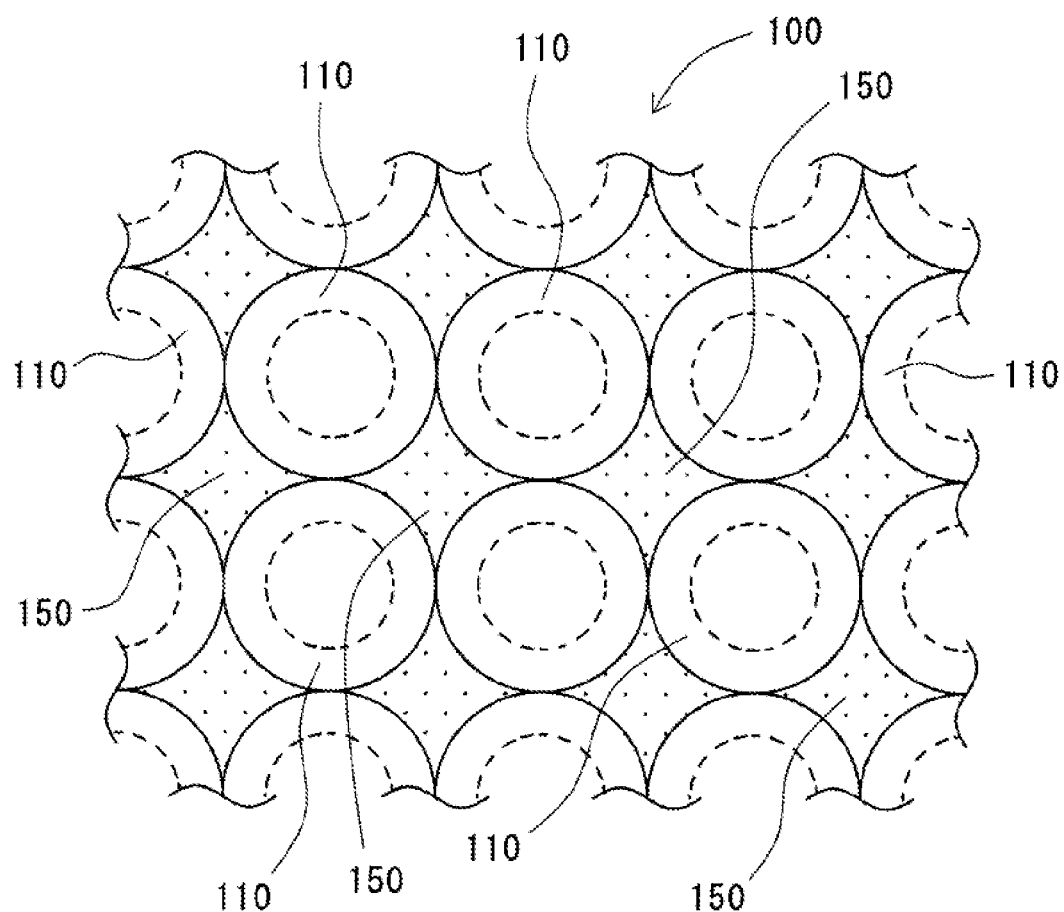
FIG. 4 is a plan view showing a part of a roughened surface adhesion portion according to the embodiment of the present disclosure in an enlarged manner.

FIG. 4 is a plan view showing a part of the roughened surface adhesion portion 100 according to the embodiment in an enlarged manner. In the case of the embodiment, the roughened surface adhesion portion 100 is formed such that the outer ring of one circular roughened region 110 is brought into contact with the outer rings of four circular roughened regions 110. Then, a portion having a small area surrounded by the four circular roughened regions 110 is not roughened (activated) by laser irradiation and is a non-roughened region 150 with the original flat surface of the base metal.

Next, in order to confirm the utility of the present disclosure, an evaluation test was performed. The details of the evaluation test and the evaluation test results will be described. In these embodiments, a large number of test pieces are prepared with roughened surface adhesion portions having the pitch of adjacent laser irradiation portions being set to be slightly different from those of the other test pieces. Resin plates formed of polyimide (PI) are adhered to the roughened surface adhesion portions with an adhesive. The peel force of each of resin plates adhered to the respective roughened surface adhesion portions is measured. The arithmetic average roughness Ra (μm) is measured for the degree of roughness of the roughened surface adhesion portion and the peel force (N) is measured for the peel force.

Figure 5A:
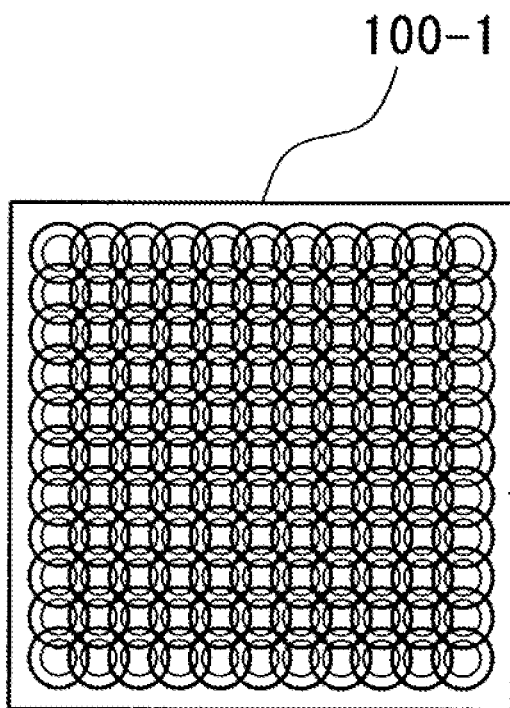
FIGS. 5A-C are illustrations illustrating examples of the present disclosure.
Figure 5B:
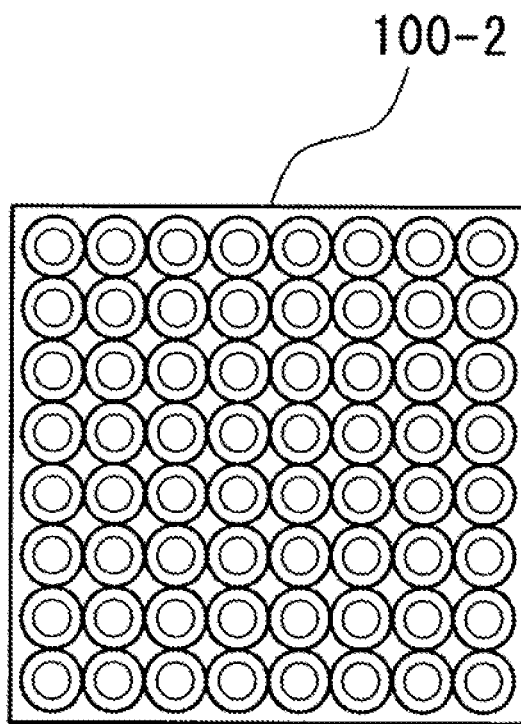
Figure 5C:
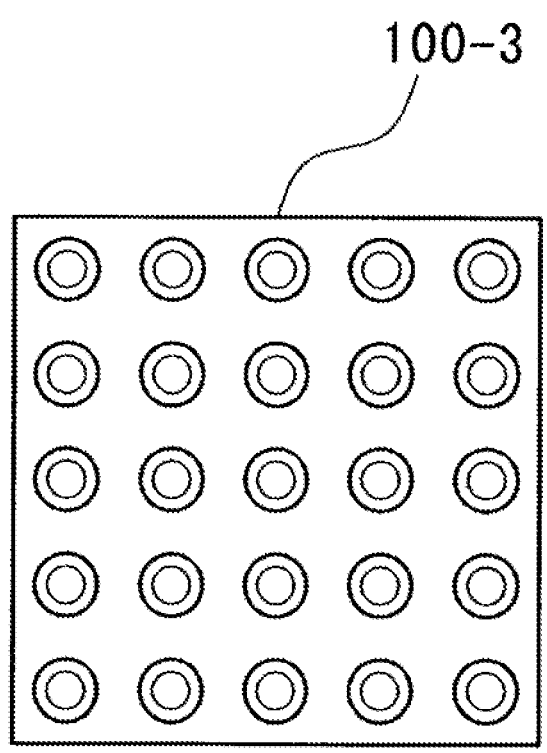

FIGS. 5A-C are views showing three roughened surface adhesion portions which are representative test pieces among a large number of evaluated test pieces in the embodiments in an enlarged manner, and the test piece 100-2 of FIG. 5B shown at the center is a test piece in which roughened regions are arranged to have the dimensional relationship corresponding to the above-described embodiment. In addition, a test piece 100-3 shown in FIG. 5C is a test piece in which each center pitch between the adjacent roughened regions is set to be larger than in the above-described embodiment. Further, a test piece 100-1 shown in FIG. 5A is a test piece in which each center pitch between the adjacent roughened regions is set to be smaller than in the above-described embodiment. In this case, the outer rings of the adjacent roughened regions are arranged to partially intersect each other. That is, the outer circumferential edge portions of roughened region partially interfere with each other. The evaluation results of these test pieces correspond to test values plotted in the corresponding portions of the test pieces 100-1, 100-2 and 100-3 shown in FIG. 6.

Figure 6:
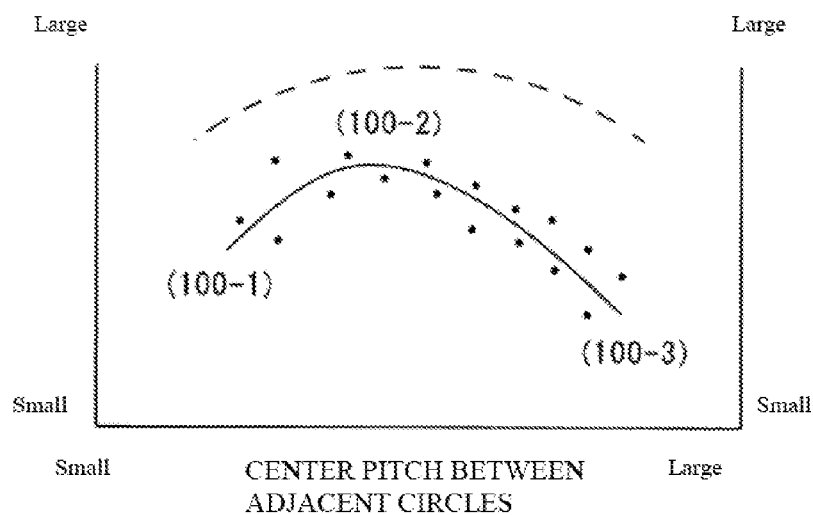
FIG. 6 is an illustration illustrating evaluation test results of examples of the present disclosure.

FIG. 6 shows evaluation test results of embodiments of the present disclosure. As clearly seen from the evaluation test results, it was found that there is a close correlation between the arithmetic average roughness Ra (μm) and the peel force (N) and regarding the best dimensional relationship for forming a roughened surface adhesion portion having surface roughness to improve adhesion force, which is the object of the present disclosure, as described in the above embodiment, a case in which when the diameter of the outer ring of the circular roughened region 110 formed by laser irradiation is "a" and the center pitch between adjacent roughened regions 110 is "d", a case in which the roughened regions are arranged so as to satisfy the relationship of "a=d" is most preferable (refer to (100-2) in FIGS. 5A-C and 6). However, considering the relationship from the viewpoint of exhibiting the effect of the present disclosure, it was found that even when the relationship between the diameter "a" of the roughened region 110 and the center pitch "d" of adjacent roughened regions 110 is 0.5a<d<1.5a, sufficient adhesion force in the roughened surface adhesion portion can be ensured (refer to (100-1) and (100-3) in FIGS. 5A-C and 6).

Hereinafter, advantages of the above-described surface treatment method will be described. According to the surface treatment method of the present disclosure, processes of "first attaching a masking tape to a metal surface, and removing abrasives and metal filings after performing sandblasting and peeling off the masking tape", which are required in the related art in the case in which the roughened surface adhesion portion is formed by sandblasting instead of laser irradiation, are not required and the working efficiency in the adhesion process can be increased. In addition, the surface treatment method according to the present disclosure may not cause a problem that abrasives and metal filings remain on the adhesive layer when the entirety including the metal surface is washed, and the remaining abrasives and metal filings causes deterioration in adhesion in a case where the resin component is adhered to the metal component.

In addition, when the strain body as a metal member is irradiated with a laser with the dimensional relationship as described in the above, it is possible to prevent a problem in the related art from arising wherein "a wide unprocessed base metal region (flat region) not roughened by the laser beam remains on the surface of the metal member in the case in which the roughened surface portion having a wide laser beam irradiation range and a wide hatching width is formed on the surface of the metal member (strain body), and even when the resin member adheres to the metal member with an adhesive layer interposed between, the adhesive layer is peeled off from this unprocessed region, and sufficient adhesion strength cannot be ensured".

Figure 8:
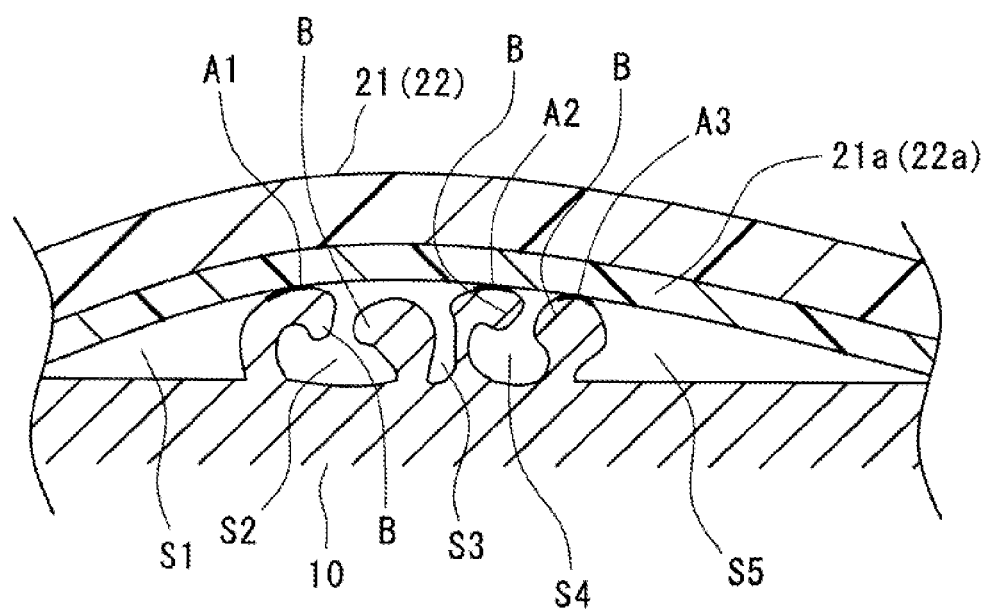

Further, it is also possible to prevent a problem in the related art that arises when a resin material is attached to a metal member with an adhesive layer of an adhesive or the like, wherein the metal member is provided to exhibit an anchor effect during injection molding. That is, when laser irradiation is performed on the assumption that the laser irradiation is used in injection molding in the related art, as shown in FIG. 8, the metal surface is intentionally considerably roughened with a laser beam and excessively elevated to form a bridge between adjacent portions, and the resin passes under the bridge B so that the bridge B performs a role in anchor effect. However, when the resin component is attached to the metal component with an adhesive layer of an adhesive or the like interposed between, the adhesive or the like does not enter under the bridge B and thus an air layer (refer to spaces S1 to S5 in which an air layer is formed in FIG. 8) under or near the bridge B, where it should exhibit the conventional anchor effect is formed. Therefore, when the strain body 10 is used as a metal member, as shown in FIG. 8, even in a case in which the strain gauge 20 is attached to the strain body 10 with the adhesive layer 21a (22a) of an adhesive or the like, the area in which the adhesive layer 21a (22a) is in close contact with the surface of the strain body 10 is considerably reduced. Thus, sufficient adhesion strength cannot be maintained and the strain gauge 20 is easily peeled off from the strain body 10 (refer to the areas of actual adhesion portions A1 to A3 in FIG. 8). However, in the case of the surface treatment method according to the present disclosure, such problems can be prevented from arising.

The dimensional relationship between adjacent roughened regions 110 as described in the above embodiment is most preferable when the roughened surface adhesion portion 100 is formed such that all the dimensional relationship between the adjacent circular roughened regions is "a=d". However, as seen from the above-described evaluation test results of embodiments, the dimensional relationship according to the present disclosure is not limited to the dimensional relationship of the embodiment.

That is, in the evaluation test results, even when the roughened surface adhesion portion is formed such that the relationship when the diameter of the outer ring of each of all roughened regions 110 formed by laser irradiation is "a" and the center pitch between adjacent roughened regions 110 formed by laser irradiation is "d" is 0.5a<d<1.5a, the advantages of the present disclosure can be sufficiently exhibited.

Figure 7:
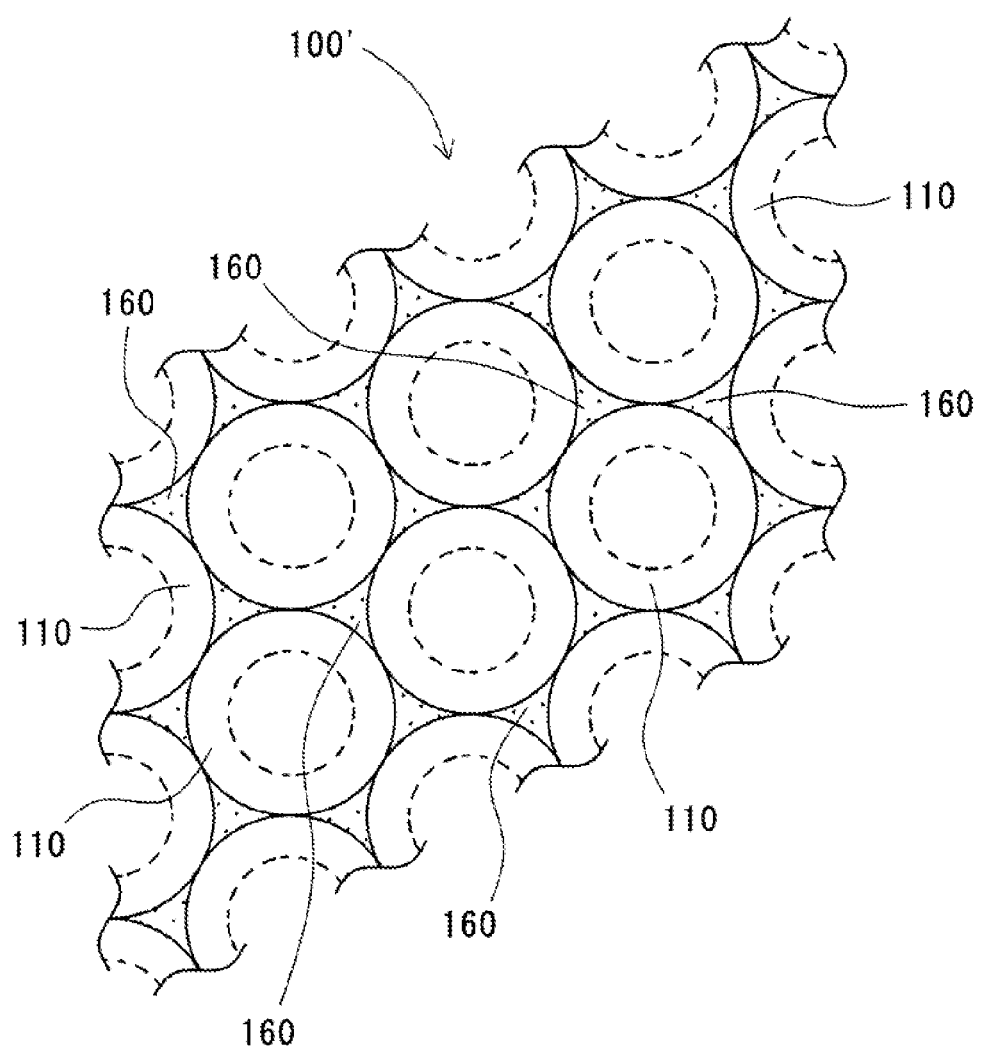
FIG. 7 is a plan view showing a part of a roughened surface adhesion portion different from the roughened surface adhesion portion of FIG. 4 in an enlarged manner and FIG. 8 is an illustration illustrating problems arising when a resin member adheres to a metal member with an adhesive layer interposed between by laser irradiation in the related art.

Further, the shape of the roughened surface adhesion portion according to the present disclosure may not be limited to the shape of the embodiment shown in FIG. 4. That is, the roughened regions may be arranged such that the outer rings of six circular roughened regions 110 are close to the outer ring of one circular roughened region 110 by laser irradiation like a roughened surface adhesion portion 100' shown in FIG. 7. When each roughened region 110 is formed with this arrangement, the non-roughened region (flat base metal region not roughened by laser irradiation) can be smaller in the roughened surface adhesion portion 100 of the strain body 10 in a case in which the outer rings of six roughened surface adhesion portions 100 are close to the outer ring of one roughened surface adhesion portion 100 (refer to a non-roughened region 160 in FIG. 7) compared to a case in which the outer rings of four roughened surface adhesion portions 100 are close to the outer ring of one roughened surface adhesion portion 100 (refer to the non-roughened region 150 in FIG. 4), and the total area of the non-roughened regions, which do not contribute to improving adhesion force, can be reduced due to the reduced area. Thus, it is advantageous in that peeling resistance can be improved.

In the above description of the present disclosure, a force sensor composed of the polyimide resin plate is attached to the strain body formed of metal with an adhesive layer of an adhesive or the like interposed between. However, the present disclosure is not necessarily limited thereto and may be applied to a case in which, for example, a temperature sensor formed of a resin plate obtained by perform patterning on a metal foil adheres to a support body formed of metal.

In such a case, according to the conventional roughened surface adhesion portion formation method using sandblasting, for example, a problem that the temperature sensor is easily peeled off from the support body due to a difference in thermal expansion coefficients of both the materials may be solved by forming a roughened surface adhesion portion in the support body through the surface treatment method for a metal material according to the present disclosure.

What is claimed is:

1. A surface treatment method for roughening a surface of a metal material by a laser beam, the method comprising:
  forming a roughened surface adhesion portion on the surface of the metal material by irradiating the laser beam on the surface of the metal material to form a plurality of roughened regions within the roughened surface adhesion portion, each of the roughened regions being formed in a circular shape having an outer ring adjacent to each other,
  wherein the roughened regions are arranged to satisfy the following Equation (1):

$$0.5a<d<1.5a \quad (1)$$

where "a" is a diameter of the outer ring of each of the roughened regions, and "d" is a center pitch between adjacent roughened regions.

2. The surface treatment method according to claim 1, wherein the roughened regions are arranged in a pattern in which the outer ring of each of the roughened regions is adjacent to the outer rings of four adjacent roughened regions.

3. The surface treatment method according to claim 1, wherein the roughened regions are arranged in a pattern in which the outer ring of each of the roughened regions is adjacent to the outer rings of six adjacent roughened regions.

4. The surface treatment method according to claim 1, Wherein the roughened regions are arranged to satisfy the following Equation (2):

$$a=d. \quad (2)$$

5. The surface treatment method according to claim 4, wherein the roughened regions are arranged in a pattern in which the outer ring of each of the roughened regions is adjacent to the outer rings of four adjacent roughened regions.

6. A force sensor comprising:
  a strain body formed of a metal material having a roughened surface adhesion portion on at least one surface, the roughed surface adhesion portion being formed by the surface treatment method according to claim 5; and
  a strain gauge attached to the roughened surface adhesion portion with an adhesive.

7. The surface treatment method according to claim 4, wherein the roughened regions are arranged in a pattern in which the outer ring of each of the roughened regions is adjacent to the outer rings of six adjacent roughened regions.

8. A force sensor comprising:
  a strain body formed of a metal material having a roughened surface adhesion portion on at least one surface, the roughed surface adhesion portion being formed by the surface treatment method according to claim 6; and
  a strain gauge attached to the roughened surface adhesion portion with an adhesive.

9. A force sensor comprising:
  a strain body formed of a metal material having a roughened surface adhesion portion on at least one surface, the roughed surface adhesion portion being formed by the surface treatment method according to claim 4; and
  a strain gauge attached to the roughened surface adhesion portion with an adhesive.

10. A force sensor comprising:
  a strain body formed of a metal material having a roughened surface adhesion portion on at least one surface, the roughed surface adhesion portion being formed by the surface treatment method according to claim 1; and
  a strain gauge attached to the roughened surface adhesion portion with an adhesive.

11. A force sensor comprising:
  a strain body formed of a metal material and having a hollow portion located at an inner central portion, the strain body having a roughened surface adhesion portion formed above the hollow portion; and at strain gauge attached to the roughened surface adhesion portion with an adhesive, wherein each of the roughened regions being formed in a circular shape having an outer ring adjacent to each other, and wherein the roughened regions are arranged to satisfy the following Equation (3):

$$0.5a < d < 1.5a \qquad (3)$$

where "a" is a diameter of the outer ring of each of the roughened regions, and "d" is a center pitch between adjacent roughened regions.

12. The force sensor according to claim 11,
wherein the roughened regions are arranged in a pattern in which the outer ring of each of the roughened regions is adjacent to the outer rings of four adjacent roughened regions.

13. The force sensor according to claim 11,
wherein the roughened regions are arranged in a pattern in which the outer ring of each of the roughened regions is adjacent to the outer rings of six adjacent roughened regions.

14. The force sensor according to claim 11,
Wherein the roughened regions are arranged to satisfy the following Equation (4):

$$a = d. \qquad (4)$$

15. The force sensor according to claim 14,
wherein the roughened regions are arranged in a pattern in which the outer ring of each of the roughened regions is adjacent to the outer rings of four adjacent roughened regions.

16. The force sensor according to claim 14,
wherein the roughened regions are arranged in a pattern in which the outer ring of each of the roughened regions is adjacent to the outer rings of six adjacent roughened regions.

* * * * *